United States Patent
Ikeda et al.

(10) Patent No.: US 9,765,823 B2
(45) Date of Patent: Sep. 19, 2017

(54) STEERING APPARATUS

(71) Applicant: NSK Ltd., Shinagawa-ku, Tokyo (JP)

(72) Inventors: Shuhei Ikeda, Maebashi (JP); Ryoichi Suzuki, Maebashi (JP); Makoto Nagasawa, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 14/769,442

(22) PCT Filed: Jul. 15, 2014

(86) PCT No.: PCT/JP2014/068798
§ 371 (c)(1),
(2) Date: Aug. 20, 2015

(87) PCT Pub. No.: WO2015/008754
PCT Pub. Date: Jan. 22, 2015

(65) Prior Publication Data
US 2016/0146257 A1    May 26, 2016

(30) Foreign Application Priority Data

Jul. 16, 2013 (JP) ................................. 2013-147595
Nov. 13, 2013 (JP) ................................. 2013-234935
(Continued)

(51) Int. Cl.
*B62D 1/20* (2006.01)
*F16D 3/38* (2006.01)
(Continued)

(52) U.S. Cl.
CPC ............. *F16D 1/0864* (2013.01); *B62D 1/20* (2013.01); *F16D 1/116* (2013.01); *F16D 3/387* (2013.01);
(Continued)

(58) Field of Classification Search
CPC .... B62D 1/16; B62D 1/20; F16D 1/08; F16D 1/0805; F16D 1/0864; F16D 1/116;
(Continued)

(56) References Cited

U.S. PATENT DOCUMENTS 3,237,741 A * 3/1966 Gartner ..................... F16D 9/06
123/198 R
6,059,085 A * 5/2000 Farnsworth ............... F16D 9/08
192/55.1
(Continued)

FOREIGN PATENT DOCUMENTS

DE 4129042 A1 * 3/1993 ............... B62D 1/20
FR 2608232 A1 * 6/1988 ............... B62D 1/16
(Continued)

OTHER PUBLICATIONS

Specification Translation of JP 2003-335246. Maruyama, et al. Steering Device. Nov. 25, 2003 Unisia JKC Steering System Co Ltd.*
(Continued)

*Primary Examiner* — Josh Skroupa
(74) *Attorney, Agent, or Firm* — Shapiro, Gabor and Rosenberger, PLLC

(57) ABSTRACT

A guide member 48 includes a cylindrical portion 52 fitted to a front end of a pinion shaft 19 and extending on the side of an opposite yoke and a slit engagement plate 54 extending on the side of the pinion shaft 19 from a portion, on the side of the pinion shaft 19, of the cylindrical portion 52 and engaging with a slit 42 of a yoke 22, the cylindrical portion 52 being inserted first in a clamp portion 36 of the yoke 22 upon the yoke 22 being fitted to the pinion shaft 19, the yoke 22 being rotatably guided by the cylindrical portion 52.

8 Claims, 22 Drawing Sheets

(30) Foreign Application Priority Data

| Nov. 21, 2013 | (JP) | ................................ 2013-240976 |
| Feb. 19, 2014 | (JP) | ................................ 2014-029558 |
| Jun. 24, 2014 | (JP) | ................................ 2014-129248 |
| Jul. 1, 2014 | (JP) | ................................ 2014-135841 |

(51) Int. Cl.
  *F16D 1/08* (2006.01)
  *F16D 1/116* (2006.01)
  *F16D 1/10* (2006.01)

(52) U.S. Cl.
  CPC ... *F16D 2001/103* (2013.01); *Y10T 403/7194* (2015.01)

(58) Field of Classification Search
  CPC .. F16D 3/387; F16D 2001/103; Y10T 403/10; Y10T 403/11; Y10T 403/1616; Y10T 403/1624; Y10T 403/53; Y10T 403/535; Y10T 403/58; Y10T 403/581; Y10T 403/7018; Y10T 403/7182; Y10T 403/7188
  USPC .. 403/1, 2, 13, 14, 289, 290, 315, 316, 355, 403/398, 399; 280/775, 777, 779, 780; 72/492
  See application file for complete search history.

(56) References Cited

U.S. PATENT DOCUMENTS

| 7,445,242 B2* | 11/2008 | Yamaguchi | B62D 1/16 280/779 |
| 2013/0051901 A1* | 2/2013 | Otani | B62D 1/20 403/164 |
| 2014/0020487 A1* | 1/2014 | Neidlinger, II | F16D 1/0864 74/89.17 |

FOREIGN PATENT DOCUMENTS

| FR | 2627560 A1 * | 8/1989 | ............... B62D 1/16 |
| JP | 6-221333 A | 8/1994 | |
| JP | 2003-335246 A | 11/2003 | |
| JP | 2008-132845 A | 6/2008 | |
| JP | 2011-88508 A | 5/2011 | |
| WO | WO 2010/116537 A1 | 10/2010 | |

OTHER PUBLICATIONS

Corrected Version of International Preliminary Report on Patentability from International Patent Application No. PCT/JP2014/068798, mailed Feb. 9, 2016.

* cited by examiner

STEERING APPARATUS

TECHNICAL FIELD

The present invention relates generally to a steering apparatus including a guide member to guide a yoke and a shaft member when assembling the yoke of a universal joint and the shaft member together, and more particularly to the guide member and a joining structure for joining the yoke of the universal joint to a pinion shaft in a steering apparatus of a rack-and-pinion type.

BACKGROUND ART

There has hitherto been disclosed a structure for serration-engaging the universal joint fitted to an end portion of an intermediate shaft of the steering apparatus with the pinion shaft of a rack-and-pinion mechanism (refer to, e.g., Patent documents 1 and 2).

Patent document 1 describes a guide member and a joining structure using a guide chip for positioning a yoke with respect to a pinion shaft in a rotating direction and an inserting direction of the yoke in order to fix an insertion position of a bolt for clamping the yoke for the pinion shaft and assemble the yoke of the universal joint to the pinion shaft while determining a neutral state of a steering wheel when assembling the yoke of the universal joint to the pinion shaft.

Patent document 2 describes the guide member and the joining structure, the configuration being such that an insertion restrictive shaft for hindering the insertion of the clamping bolt when the pinion shaft is in a position different from a normal position with respect to the yoke, is formed in protrusion at a front end portion of the pinion shaft. The insertion restrictive shaft is rotatable by a small torque, and an erroneous connection state can be detected when the yoke and the pinion shaft are not clamped in a normal clamping area of the pinion shaft but clamped erroneously in the insertion restrictive shaft of the pinion shaft.

DOCUMENTS OF PRIOR ARTS

Patent Documents

Patent document 1: Japanese Patent Application Laid-Open Publication No. 2003-335246
Patent document 2: International Publication WO2010/116537

SUMMARY OF THE INVENTION

Problems to be Solved by the Invention

In Patent document 1, however, a vertical wall portion of the guide chip is small both in wall thickness and in strength, and hence a careful work is required not to bend or damage the guide chip due to a contact of the yoke with the guide chip when inserting the yoke in the pinion shaft. Especially when performing such as work as to insert the yoke in the pinion shaft from an oblique direction, further carefulness is needed. As a result, a work for determining an angle and a position of the yoke is time-consuming.

In Patent document 2, the insertion restrictive shaft of the front end portion of the pinion shaft is configured to be rotatable, and the insertion restrictive shaft is inserted first in the yoke when fitting the yoke to the pinion shaft, resulting in a high possibility that the yoke is rotated together with the insertion restrictive shaft at this time. Consequently, it is difficult to assemble the yoke and the pinion shaft together by adjusting an angle between the yoke and the pinion shaft.

The present invention, which is devised in view of such circumstances, aims at providing a steering apparatus enabling an angle to be easily adjusted when assembling a yoke to a rotary shaft instanced by a pinion shaft and other equivalent shafts, and also enabling assembly workability to be improved.

Means for Solving the Problems

For solving the problems described above, the present invention provides a steering apparatus including: a first shaft member transferring a steering force; a second shaft member transferring the steering force by connecting to the first shaft member; a clamp portion fitted to the vicinity of an end portion of the second shaft member on the side of the first shaft member and formed with a slit penetrating in an axial direction and a radial direction of the second shaft member; a couple of arm portions protruding on the side of the first shaft member from an end portion of the clamp portion and disposed facing each other; a joint cross configuring a universal joint by connecting the couple of arm portions to the opposite yoke fixed to the first shaft member; and a guide member including a cylindrical portion fitted to an end portion of the second shaft member and disposed between the couple of arm portions, and a slit engagement plate protruding outward in the radial direction from a portion, on the side of the second shaft member, of the cylindrical portion, extending to the second shaft member, and disposed within the slit.

In the steering apparatus according to the present invention, preferably, a protruded portion extending up to an intermediate portion of the cylindrical portion and fitted in the cylindrical portion is formed on the end portion of the second shaft member.

Separately from the foregoing, in the steering apparatus according to the present invention, preferably, the cylindrical portion collapses by being brought into contact with the opposite yoke.

Separately from the foregoing, in the steering apparatus according to the present invention, preferably, a dimension of an inside diameter of an inner peripheral surface of a portion, on the side of the first shaft member, of the cylindrical portion is larger than on the side of the second shaft member.

Separately from the foregoing, in the steering apparatus according to the present invention, preferably, a front end portion of the cylindrical portion is chamfered.

Separately from the foregoing, in the steering apparatus according to the present invention, preferably, a slit being orthogonal to the axial direction of the cylindrical portion and extending in such a direction that the couple of arm portions are in a face-to-face relation, is formed in the front end portion of the cylindrical portion.

Separately from the foregoing, in the steering apparatus according to the present invention, preferably, the front end portion, on an inside diametrical side, of the cylindrical portion takes an elliptical shape with a long side being set in the direction of the couple of arm portions in the face-to-face relation.

Separately from the foregoing, in the steering apparatus according to the present invention, preferably, the cylindrical portion is configured to include: a shaft member sided cylindrical portion fitted to the second shaft member; an opposite yoke sided cylindrical portion disposed on the side of the opposite yoke; and a portion to be ruptured connecting the opposite yoke sided cylindrical portion to the shaft member sided cylindrical portion.

Separately from the foregoing, in the steering apparatus according to the present invention, preferably, the end portion of the shaft member is formed with a hole portion, and a small diametrical portion formed in the cylindrical portion is fitted in the hole portion.

Effect of the Invention

According to the present invention, it is feasible to provide the steering apparatus enabling the angle to be easily adjusted and the assembly workability to be improved when assembling the yoke to the rotary shaft.

BRIEF DESCRIPTION OF THE DRAWINGS

FIG. 3A is a perspective view; and FIG. 3B is a sectional view.

FIG. 4A is a front view of a cylindrical portion; FIG. 4B is a side view of the whole components; and FIG. 4C is a front view of a ring portion.

FIG. 5A is a front view; and FIG. B is a side view.

FIG. 8A is a front view of the cylindrical portion; FIG. 8B is a side view of the whole components; and FIG. 8C is a front view of the ring portion.

FIG. 11A is a front view of the cylindrical portion; FIG. 11B is a side view of the whole components; and FIG. 11C is a front view of the ring portion.

FIG. 12A is a side view; and FIG. 12B is a perspective view.

FIGS. 14A, 14B and 4C are simplex views of the guide member according to a fourth embodiment; FIG. 14A is a front view of the cylindrical portion; FIG. 14B is a side view of the whole components.

FIG. 15A is a side view; and FIG. 15B is a perspective view.

FIG. 18A is a front view of the cylindrical portion; FIG. 18B is a side view of the whole components; and FIG. 18C is a front view of the ring portion.

FIG. 19A is a side view with some portions being cut off; and FIG. 19 is a perspective view.

MODE FOR CARRYING OUT THE INVENTION

Embodiments of the present invention will hereinafter be described with reference to the drawings. Note that an upper side or an upward side is the same in definition as a rear side of a vehicle, and a lower side or a downward side is the same in definition as a front side of the vehicle with respect to a steering apparatus in the present specification throughout.

First Embodiment

The steering apparatus according to a first embodiment of the present application will hereinafter be described.

Figure 1:
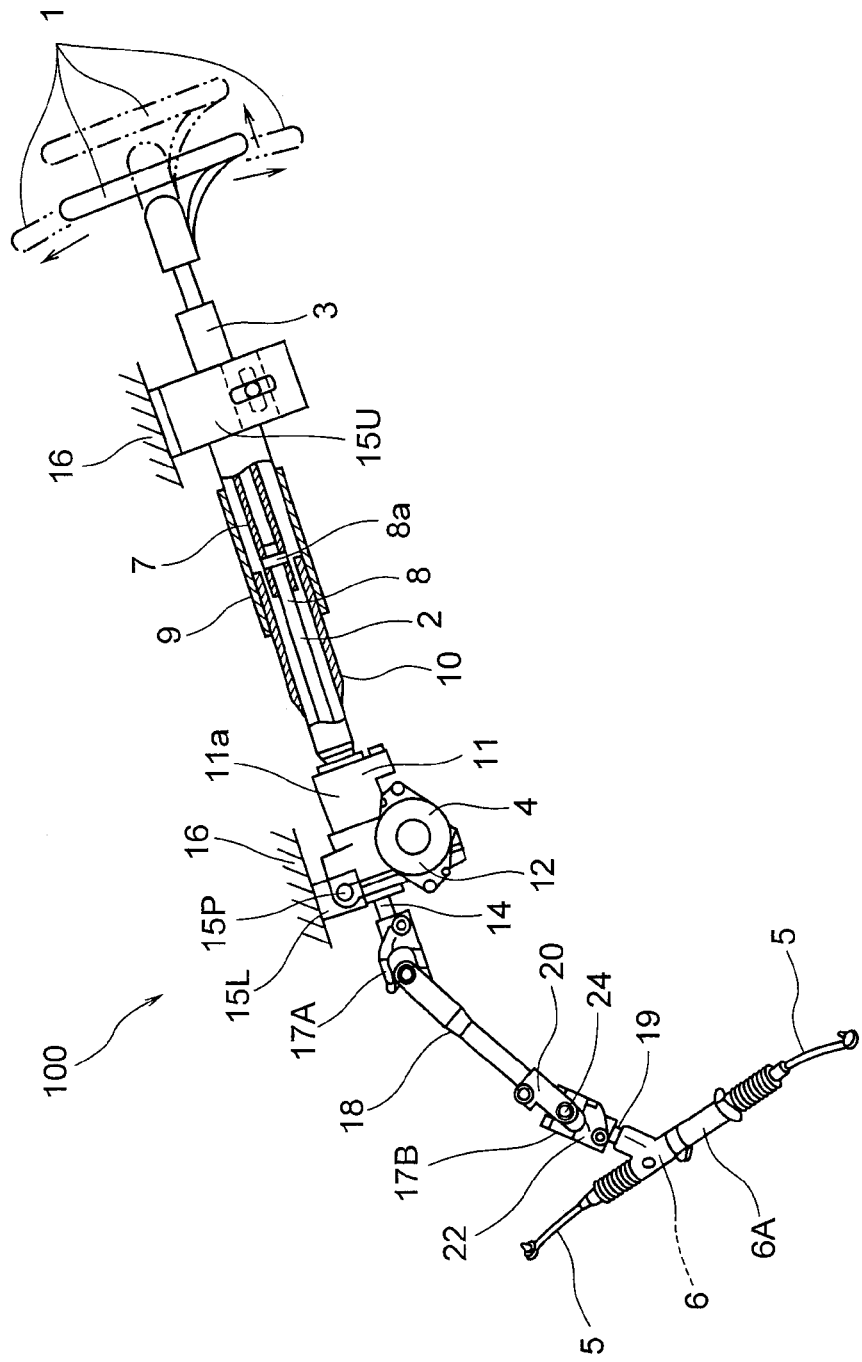
FIG. 1 is a perspective view illustrating a whole configuration of a steering apparatus according to a first embodiment.

FIG. 1 is a perspective view illustrating a whole configuration of the steering apparatus according to the first embodiment. The steering apparatus according to the first embodiment is an electric power steering apparatus of a rack-and-pinion type. Note that the invention of the present application can be applied to other types of steering apparatuses without being limited to the electric power steering apparatus of the rack-and-pinion type.

As depicted in FIG. 1, a steering apparatus 100 includes a steering shaft 2 with a steering wheel 1 being fitted to an end portion of the shaft 2 on the rear side of the vehicle, i.e., on a right side as viewed on the sheet surface in FIG. 1, a cylindrical steering column 3 with the steering shaft 2 being rotatably supported on an inside-diametrical side of the column 3, a steering assist mechanism 4 joined to the steering shaft 2 on the front side of the vehicle, i.e., joined to an end portion of the shaft 2 on a left side as viewed on the sheet surface in FIG. 1.

The steering assist mechanism 4 includes an unillustrated torque sensor, an electric motor 12 to generate an assist steering torque corresponding to a steering torque detected by the torque sensor, and a deceleration mechanism 11 joined to the electric motor 12 and housed in a housing 11a, an operation being such that the assist steering torque generated by the electric motor 12 is transferred to an output shaft 14 of the steering assist mechanism 4 via the deceleration mechanism 11. The deceleration mechanism 11 is configured to include an unillustrated worm provided on an unillustrated motor shaft of the electric motor 12, and an unillustrated worm wheel fixed to the output shaft 14 and meshing with the worm.

The steering shaft 2 includes an outer shaft 7 defined as an upper shaft, and an inner shaft 8 defined a lower shaft, and a front end portion of the outer shaft 7 and a rear end portion of the inner shaft 8 are spline-engaged with each other and joined together via a synthetic resin 8a. This configuration attains a structure causing the synthetic resin 8a to be fractured by the outer shaft 7 and the inner shaft 8 upon a collision, thereby enabling an overall length to be reduced. The steering column 3 is constructed by combining an outer column 9 defined as an upper column with an inner column 10 defined as a lower column in a telescoping system, and, upon an impact being applied in an axial direction, an overall length is reduced while absorbing an impact energy, thus attaining a collapsible structure.

The outer column 9 of the steering column 3 is supported by an upper vehicle-sided bracket 15U in an adjustable manner in a tilt position and a telescopic position with respect to a vehicle-sided member 16. The housing 11a of the deceleration mechanism 11 in the steering assist mechanism 4 is supported in a swingable manner in up-and-down directions about a pivot shaft 15p that is pivotably provided in a lower vehicle-sided bracket 15L fitted to the vehicle-sided member 16.

The inner column 10 is positioned at a rear end of the housing 11a of the deceleration mechanism 11. The inner shaft 8 is a shaft, of which a front end side portion is inserted into the housing 11a, the front end being connected to the output shaft 14 of the steering assist mechanism 4. The output shaft 14 protrudes toward a front side of a vehicle body from the front end of the housing 11a.

A vehicle-sided rear end of an intermediate shaft 18 is connected to the output shaft 14 of the steering assist mechanism 4 via an upper sided universal joint 17A. A vehicle-sided front end of the intermediate shaft 18 is connected to a pinion shaft 19 of a steering gear mechanism 6 of the rack-and-pinion type via a lower sided universal joint 17B. The lower sided universal joint 17B is configured to include an upper sided yoke 20, a lower sided yoke 22, and a joint cross 24 making these two yokes 20, 22 swingable and enabling the torque to be transmitted. In the first embodiment, the intermediate shaft 18 corresponds to a first shaft member described in the paragraph titled [Means for Solving the Problems], and the pinion shaft 19 corresponds to a second shaft member described in the same paragraph.

An upper end portion of the pinion shaft 19 protrudes upward to a predetermined length from an upper end portion of a gear housing 6A of the steering gear mechanism 6, and the lower sided yoke 22 of the universal joint 17B is connected to this protruded upper end portion. An unillustrated rack shaft is supported movably in a widthwise direction of the vehicle within the gear housing 6A, and an unillustrated pinion of the pinion shaft 19 meshes with unillustrated rack teeth of the rack shaft. Both end portions of the rack shaft are connected to an unillustrated steering wheel via tie rods 5, 5.

With the steering apparatus 100 being configured as described above, when a driver rotationally operates the steering wheel 1, an unillustrated torque sensor detects a steering torque applied to the steering shaft 2, an assist steering torque generated corresponding the detected steering torque by the electric motor 12 is transferred to the output shaft 14 via the deceleration mechanism 11 and further to the pinion shaft 19 via the intermediate shaft 18. Upon a rotation of the pinion shaft 19, the unillustrated rack shaft meshing with the pinion shaft 19 is driven in the axial direction, i.e., in the widthwise direction of the vehicle, thereby turning right and left turning wheels connected to the tie rods 5, 5.

Figure 2:
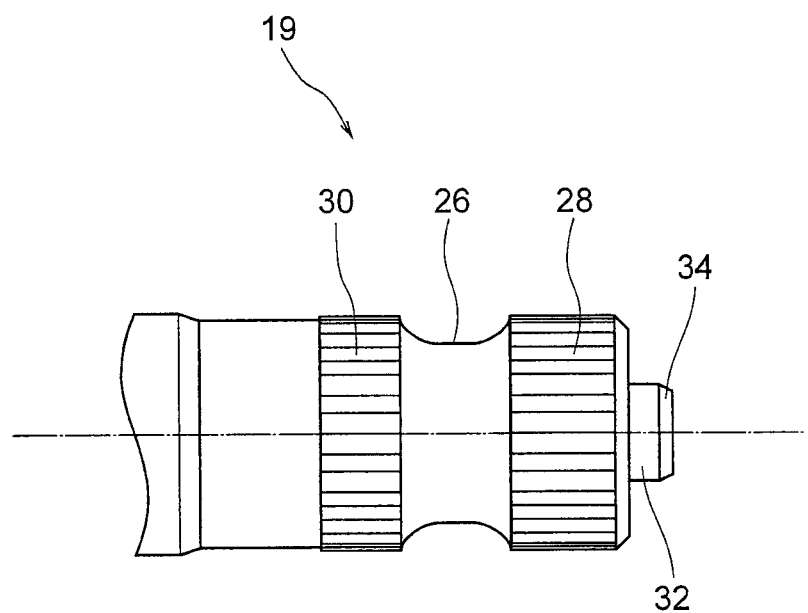
FIG. 2 is an enlarged view of an upper sided portion of a pinion shaft according to the first embodiment.

FIG. 2 is an enlarged view of the upper sided portion of the pinion shaft 19 according to the first embodiment. In FIG. 2, a right direction as viewed on the sheet surface corresponds to the upper side, i.e., the rear side of the vehicle body, while a left direction as viewed on the sheet surface corresponds to the lower side, i.e., the front side of the vehicle body. Note that the same definitions of these directions are applied to FIGS. 3B, 4B, 5B, 6 and 7.

As described above, the upper end portion of the pinion shaft 19 protrudes upward to the predetermined length from the upper end portion of the gear housing 6A of the steering gear mechanism 6. As depicted in FIG. 2, an annular groove 26 taking substantially arc shape in section is formed along an outer periphery of the protruded portion of the pinion shaft 19. An upper male serration 28 is formed along an entire outer peripheral surface of the pinion shaft 19 adjacent to an upper sided portion of the annular groove 26, and a lower male serration 30 is formed along the entire outer peripheral surface of the pinion shaft 19 adjacent to a lower sided portion of the annular groove 26.

A cylindrical protruded portion 32 is formed on the upper end portion of the pinion shaft 19, the protruded portion 32 protruding in the axial direction of the pinion shaft 19, i.e., protruding upward and having a smaller diameter than each of outside diameters of the upper male serration 28 and the lower male serration 30 of the pinion shaft 19. The protruded portion 32 is formed coaxially with the pinion shaft 19, and protrudes upward by a lengthwise dimension as large as a half of lengthwise dimension of the upper male serration 28 in the axial direction. A chamfer 34 is formed at an upper edge of the protruded portion 32. Note that the protruded portion 32 may be integrally molded with the pinion shaft 19 into an integral member, and may also be formed separately from the pinion shaft 19 and then integrally fixed to the upper edge of the pinion shaft 19.

Figure 3A:
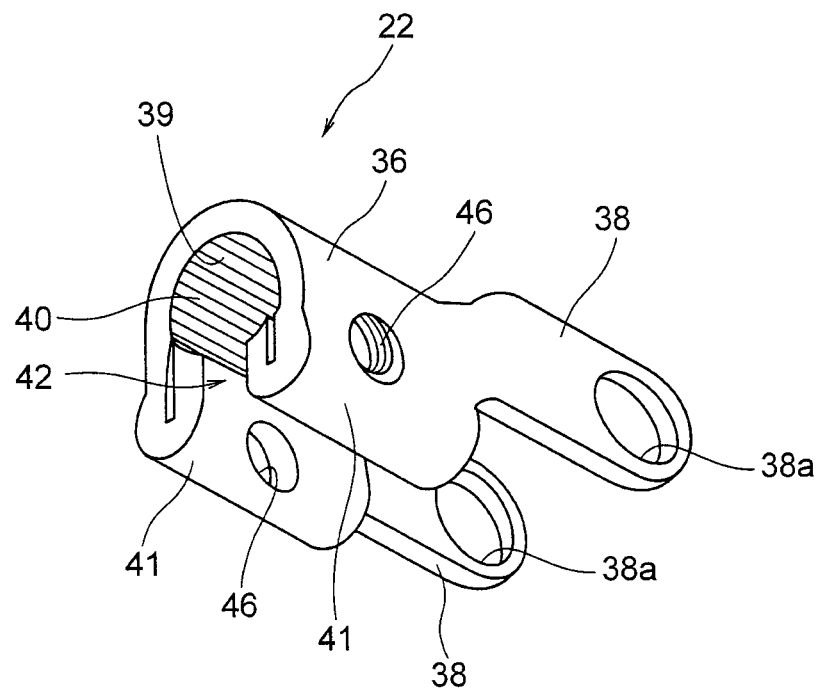
FIGS. 3A and 3B are enlarged views of a lower sided yoke 22 of a lower sided universal joint 17B according to the first embodiment.
Figure 3B:
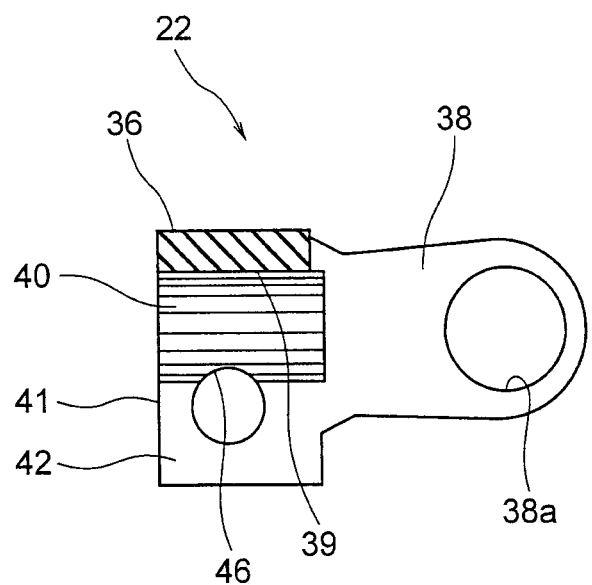

FIGS. 3A and 3B are enlarged views of a lower sided yoke 22 of a lower sided universal joint 17B according to the first embodiment; FIG. 3A is a perspective view; and FIG. 3B is a sectional view.

The yoke 22 includes a substantially cylindrical clamp portion 36 connected and clamped to the upper end portion of the pinion shaft 19, and a couple of arm portions 38, 38 extending on the rear side of the vehicle, i.e., on the upward side in the axial direction of the clamp portion 36 from an upper end portion of the clamp portion 36 and connected to the upper sided yoke 20 via the joint cross 24. The couple of arm portions 38, 38 are a couple of plate members disposed in a face-to-face relation, and are formed with through-holes 38a receiving the joint cross 24. Note that FIG. 3B depicts the yoke 22 in a state of being viewed from a side surface when cutting off the yoke 22 at a point between the couple of arm portions 38, 38 in the axial direction of the yoke 22, i.e., in bilateral directions on the sheet surface of FIG. 3B.

An inner peripheral side of the clamp portion 36 of the yoke 22 configures a connection hole 39 in and to which the upper end portion of the pinion shaft 19 is inserted and connected, and an inner peripheral surface of the clamp portion 36 is formed with a female serration 40 engaging with the upper and lower serrations 28, 30 of the pinion shaft 19, the serration 40 extending along an entire periphery thereof and over an overall length of the inner peripheral surface in the axial direction. The connection hole 39 penetrates the clamp portion 36 from the upper end down to the lower end, i.e., penetrating the clamp portion 36 in the axial direction.

Figure 6:
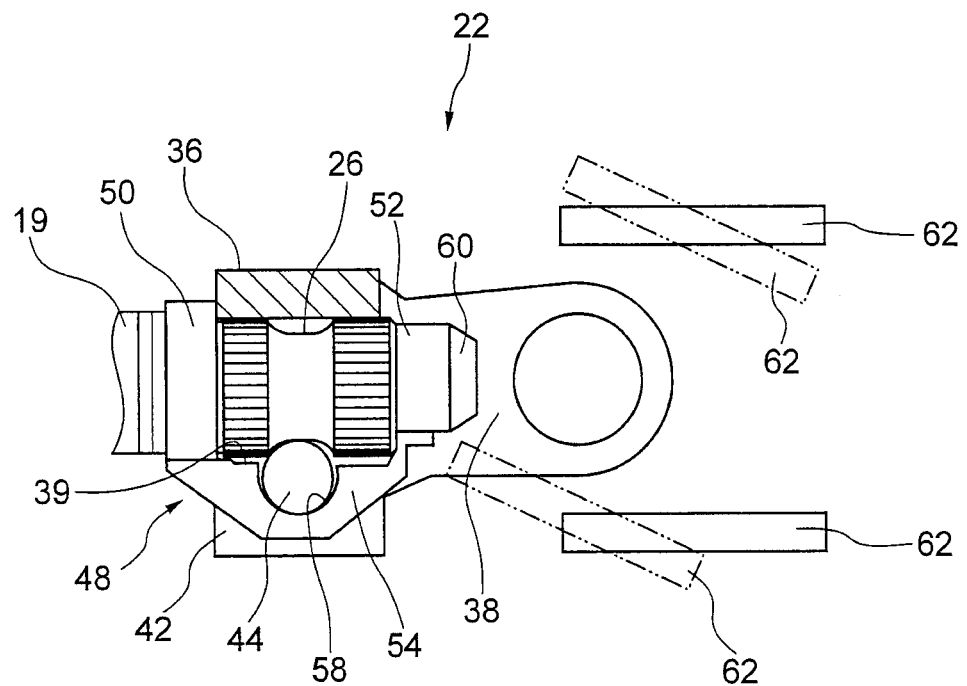
FIG. 6 is a side view depicting a state of joining the yoke to the pinion shaft to which the guide member according to the first embodiment is secured, the yoke being depicted in section.

The clamp portion 36 is provided with slit forming portions 41, 41 as a couple of plate portions having the face-to-face relation and extending in radial directions. A slit 42 formed between the slit forming portions 41, 41 penetrates the clamp portion 36 from the outer peripheral surface down to the inner peripheral surface, and extends in the axial direction of the yoke 22. The slit 42 is formed to penetrate the clamp portion 36 from the upper end down to the lower end, i.e., penetrate the portion 36 in the axial direction. The clamp portion 36 is thus configured and is therefore formed in a substantially notched C-like cylindrical shape in section. The slit forming portions 41, 41 are formed with through-holes 46, 46 traversing apart of the connection hole 39 in a direction of penetrating the slit 42. A clamping bolt is, as illustrated in FIG. 6, inserted into the through-holes 46, 46.

Figure 4A:
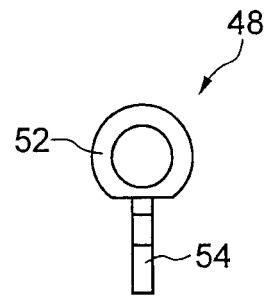
FIGS. 4A, 4B and 4C are simplex views of a guide member according to the first embodiment.
Figure 4B:
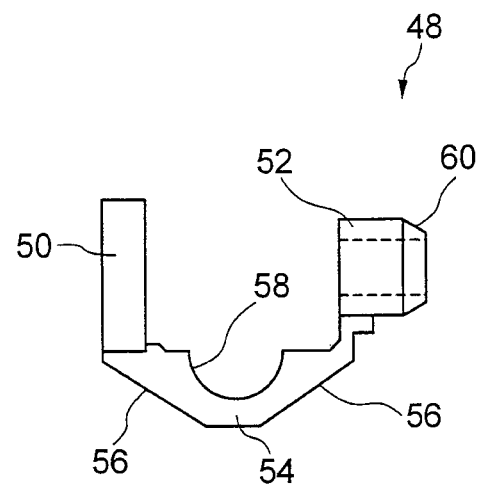
Figure 4C:
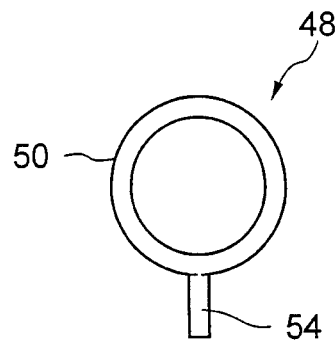
Figure 5A:
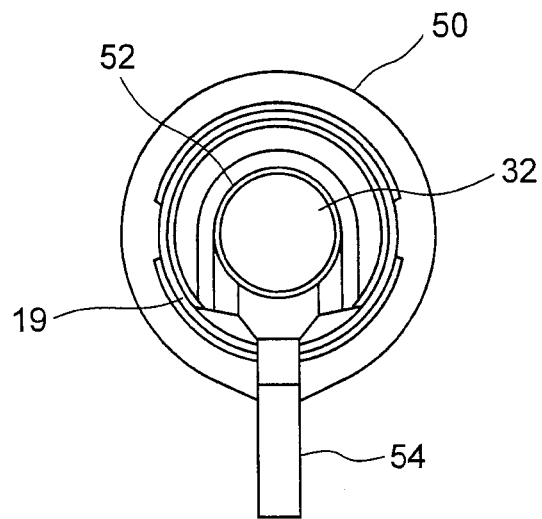
FIGS. 5A and 5B are enlarged views each illustrating an upper end portion of the pinion shaft to which the guide member according to the first embodiment is secured.
Figure 5B:
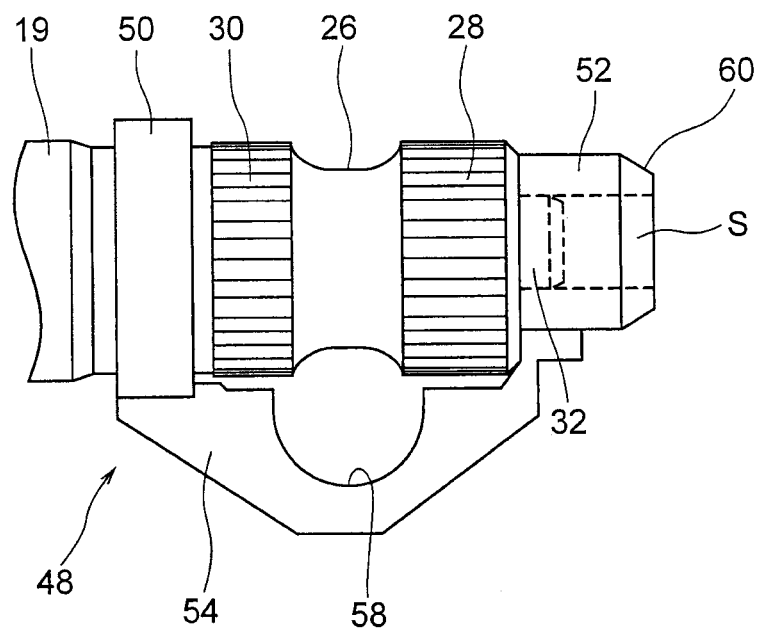

According to the first embodiment, a positioning guide member 48 is fixed to the upper end portion of the pinion shaft 19, the guide member 48 being used for assembling the yoke 22 of the universal joint 17B to the pinion shaft 19. FIGS. 4A, 4B and 4C are simplex views of the guide member 48 according to the first embodiment; FIG. 4A is a front view of the cylindrical portion 52; FIG. 4B is a side view of the whole components; and FIG. 4C is a front view of a ring portion 50. FIGS. 5A and 5B are enlarged views each illustrating the upper end portion of the pinion shaft 19 to which the guide member 48 according to the first embodiment is secured; FIG. 5A is a front view; and FIG. B is a side view.

The guide member 48 may be composed of a polyamide or polyacetal synthetic resin having oil resistance and heat resistance. As illustrated in FIGS. 4A, 4B, 4C, 5A and 5B, the guide member 48 includes a ring portion 50, a cylindrical portion 52 and a thin slit engagement plate 54, a configuration being such that an inner peripheral surface of the ring portion 50 is fitted on the outer peripheral surface of the pinion shaft 19 disposed lower than the lower sided serration 30, an inner peripheral surface of the cylindrical portion 52 is fitted on the outer peripheral surface of the protruded portion 32 formed on the upper end portion of the pinion shaft 19, and the engagement plate 54 connects the ring portion 50 and the cylindrical portion 52 together and engages within the slit 42 of the yoke 22. The ring portion 50, the cylindrical portion 52 and the slit engagement plate 54 are integrally formed.

The slit engagement plate 54 protrudes in one direction outwardly in the radial direction from the outer peripheral surface of the ring portion 50, extends upwards in the axial direction of the ring portion 50, and connects to the unidirectional side of the outer peripheral surface of the cylindrical portion 52. An outer edge portion of the slit engagement plate 54 is, as illustrated in FIG. 4B, formed with inclined portions 56, 56 with heights decreasing as becoming closer to an upper end and a lower end from an intermediate portion, the inclined portions 56, 56 taking a substantially trapezoidal shape. The slit engagement plate 54 has a notched portion taking an arch shape, the notched portion having the face-to-face relation with the annular groove 26 of the pinion shaft 19 and configuring a positioning portion 58 of the clamping bolt 44.

Both of the ring portion 50 and the cylindrical portion 52 of the guide member 48 may be fixed to the pinion shaft 19, and any one of the ring portion 50 and the cylindrical portion 52 may also be fixed. The fixation of the ring portion 50 to the pinion shaft 19 may be attained by press-fitting the ring portion 50 onto the outer peripheral surface of the pinion shaft 19, and may also be attained by serrating an inner peripheral surface of the ring portion 50 and engaging this serration with the lower sided serration 30 of the pinion shaft 19. In the case of fixing the cylindrical portion 52 to the pinion shaft 19, the cylindrical portion 52 is press-fitted onto the protruded portion 32 of the upper end of the pinion shaft 19. In the first embodiment, the ring portion 50 is press-fitted onto the outer peripheral surface of the pinion shaft 19, and the cylindrical portion 52 is press-fitted onto the outer peripheral surface of the protruded portion 32 of the pinion shaft 19. Note that any inconvenience may not be caused by loosely fitting the ring portion 50 and the protruded portion 32 together in the case of fixing the guide member 48 to the pinion shaft 19 by using only the ring portion 50.

A dimension of the outside diameter of the cylindrical portion 52 is set slightly smaller than a dimension of the inside diameter of the yoke 22, i.e., a dimension of the diameter of the connection hole 39. The cylindrical portion 52 is formed longer than a length of the protruded portion 32 of the pinion shaft 19 in the axial direction. In the first embodiment, the cylindrical portion 52 has the length that is three times as large as the length of the protruded portion 32 in the axial direction. Accordingly, in a state of the cylindrical portion 52 being assembled to the pinion shaft 19, it follows that the protruded portion 32 extends, as illustrated in FIG. 5B, up to the intermediate portion of the cylindrical portion 52 on an inside-diametrical side in the axial direction. In other words, the pinion shaft 19 is fitted to the cylindrical portion 52 up to a midway position in the axial direction on the inside-diametrical side of the cylindrical portion 52. Further in other words, the cylindrical portion 52 has such a length that a front edge of the protruded portion 32 of the pinion shaft 19 is positioned at the intermediate portion on the inside-diametrical side of the cylindrical portion 52 in the axial direction. Such being the configuration, the inside-diametrical side of the cylindrical portion 52 has a cavity S formed in the upper sided portion to which the pinion shaft 19 is not fitted.

A chamfer 60 is formed at an upper sided edge of the cylindrical portion 52. In the first embodiment, the chamfer 60 is inclined at substantially 30° toward a central axis with respect to the side surface of the cylindrical portion 52. The chamfer 60 extends, from the upper sided edge of the cylindrical portion 52, over a lengthwise range that is approximately one thirds as small as the overall length of the cylindrical portion 52 in the axial direction.

FIG. 6 is a side view depicting a state of joining the yoke 22 to the pinion shaft 19 to which the guide member 48 according to the first embodiment is secured. Note that FIG. 6 illustrates the yoke 22 in section.

As illustrated in FIG. 6, in the state of joining the pinion shaft 19 and the yoke 22 together, the cylindrical portion 52 of the guide member 48 protrudes upwardly of the upper end portion of the connection hole 39 of the clamp portion 36. It therefore follows that the cylindrical portion 52 is positioned between the couple of arm portions 38, 38. A swing circle of the couple of arm portions 62, 62 of the upper sided yoke 20 depicted in FIG. 1 encompasses this position, and it does not, however, happen that the cylindrical portion 52 interferes with the couple of arm portions 62, 62 of the upper sided yoke 20 when normally used.

However, when a joint angle of the yoke 20 against the yoke 22 augments as indicated by a broken line in FIG. 6 upon the collision and other equivalent events, the cylindrical portion 52 interferes with the couple of arm portions 62, 62. Such being the case, a contrivance of the first embodiment is that the cavity S is formed in the upper sided portion of the cylindrical portion 52, thus facilitating a collapse of the cylindrical portion 52 upon a contact with the arm portions 62, 62 on the side of the yoke 20. This configuration being adopted, a function of the joint angle, which is required in the same way as hitherto, is not deteriorated.

The chamfer 60 of the cylindrical portion 52 is, as described above, inclined at substantially 30° with respect to the side surface of the cylindrical portion 52. The portion, formed with the chamfer 60, of the cylindrical portion 52 is thinner in wall thickness than other portions of the cylindrical portion 52 and is therefore easy to collapse. The chamfer 60 can be formed longer in the axial direction by setting the inclined angle of the chamfer 60 at substantially 30° than in the case of setting the inclined angle at 45°. As a result, the upper end sided portion of the cylindrical portion 52 is structured to facilitate the collapse.

Explained next are a method of assembling the guide member 48 to the pinion shaft 19 and a method of assembling the yoke 22 to the pinion shaft 19.

The assembly of the guide member 48 to the pinion shaft 19 involves, at first, setting the steering gear mechanisms 6 in a straight forward state. Then, a phase, i.e., the angle of the pinion shaft 19 is also set in the straight forward state. Thereafter, the ring portion 50 is press-fitted onto the outer peripheral surface of the pinion shaft 19 while making alignment in a rotational direction so that the slit engagement plate 54 of the guide member 48 extends in the axial direction in a specified circumferential position, i.e., a specified rotational position, and also the cylindrical portion 52 is press-fitted onto the outer peripheral surface of the protruded portion 32 of the upper end of the pinion shaft 19. The upper edge of the protruded portion 32 is formed with the chamfer 34, and hence the cylindrical portion 52 is smoothly guided to the outer peripheral surface of the protruded portion 32. Herein, "the specified rotational position of the slit engagement plate 54" is the same as the circumferential position, i.e., the rotational position of the slit 42 of the yoke 22 when setting the steering wheel 1 in a neutral position. Thus, the guide member 48 is assembled in the specified position of the pinion shaft 19.

The assembly of the yoke 22 to the pinion shaft 19 entails, at first, setting the steering wheel 1 in the neutral position. Then, the slit 42 of the yoke 22 is coincident in rotational position with the slit engagement plate 54 of the guide member 48 fixed to the pinion shaft 19, and consequently the yoke 22 is intruded in the axial direction of the pinion shaft 19.

In the first embodiment, the cylindrical portion 52 of the guide member 48 fixed to the pinion shaft 19 is formed extending long in the axial direction, with the result that the cylindrical portion 52 is inserted first into and thus engaged within the connection hole 39 of the clamp portion 36 of the yoke 22. The upper sided edge of the cylindrical portion 52 is formed with the chamfer 60, whereby the connection hole 39 of the clamp portion 36 of the yoke 22 is smoothly guided to the outer peripheral surface of the cylindrical portion 52. An inclined angle of the chamfer 60 is set at substantially 30°, and hence the connection hole 39 of the clamp portion 36 is guided more smoothly to the outer peripheral surface of the cylindrical portion 52 than in the case of setting the inclined angle at 45°. Upon the cylindrical portion 52 engaging with the clamp portion 36, the pinion shaft 19 becomes substantially coaxial with the yoke 22.

As discussed above, according to the first embodiment, the yoke 22 is brought into contact with, at first, the cylindrical portion 52 of the guide member 48 when assembled to the pinion shaft 19, and the cylindrical portion 52 engages with the connection hole 39 of the clamp portion 36, thereby enabling prevention of the slit engagement plate 54 from being bent and damaged due to the contact with the yoke 22. Even in such an operation that the pinion shaft 19 receives insertion of the yoke 22 from an oblique direction, the slit engagement plate 54 can be prevented from being bent etc., and, when the cylindrical portion 52 further engages with the connection hole 39 of the clamp portion 36, the pinion shaft 19 becomes substantially coaxial with the yoke 22, thereby improving workability of the assembly.

The yoke 22 is further intruded in the axial direction of the pinion shaft 19 from the state where the cylindrical portion 52 engages with the connection hole 39 of the clamp portion 36 of the yoke 22. When the steering wheel 1 is kept in the neutral state, the yoke 22 is guided downward, while the slit 42 of the yoke 22 engages with the slit engagement plate 54. In other words, the yoke 22 is guided downward, while the slit engagement plate 54 is pushed into between the slit forming portion 41, 41 of the yoke 22. However, if the yoke 22 happens to rotate before the slit 42 starts engaging with the slit engagement plate 54, the slit 42 does not engage with the slit engagement plate 54, resulting in disabling the yoke 22 from being intruded. Even in such a case, according to the first embodiment, the angle between the yoke 22 and the pinion shaft 19 can be easily adjusted.

In the first embodiment, as described above, the pinion shaft 19 is substantially coaxial with the yoke 22 in the state where the cylindrical portion 52 engages with the connection hole 39 of the clamp portion 36 of the yoke 22. Further, the guide member 48 is composed of the synthetic resin, thereby facilitating a slide on the surface of the cylindrical portion 52. Accordingly, even in the state where the cylindrical portion 52 is inserted into the connection hole 39 of the clamp portion 36, the yoke 22 can be rotated lightly and smoothly. The rotational position of the slit 42 can be aligned with the position of the slit engagement plate 54 of the guide member 48 by rotating the yoke 22. The slit 42 between the slit forming portions 41, 41 can be thereby smoothly guided to the slit engagement plate 54.

Thus, the pinion shaft 19 and the yoke 22 can be positioned at a correct angle, the yoke 22 is guided downward while the slit 42 of the yoke 22 engages with the slit engagement plate 54, and the upper and lower sided serrations 28, 30 of the pinion shaft 19 engage with the serration 40 formed along the connection hole 39 of the clamp portion 36 of the yoke 22. In this state, the annular groove 26 of the pinion shaft 19, the through-hole 46 of the yoke 22 and the bolt positioning portion 58 formed on the slit engagement plate 54 of the guide member 48, are aligned on the same axial line.

Then, the clamping bolt 44 is inserted into the annular groove 26, the through-hole 46 and the bolt positioning portion 58 and is screwed to narrow a space of the slit 42, i.e., an interval between the slit forming portions 41, 41, whereby the pinion shaft 19 is held by the clamp portion 36. The yoke 22 is firmly joined to the pinion shaft 19 through the spline-engagement, thus reaching a torque transmission-enabled state.

As described above, in the steering apparatus 100 according to the first embodiment, the cylindrical portion 52 of the guide member 48 is inserted first into and engaged within the connection hole 39 of the clamp portion 36 of the yoke 22, thereby enabling the prevention of the slit engagement plate 54 of the guide member 48 from being bent and damaged. Further, the angle between the pinion shaft 19 and the yoke 22 can be easily adjusted in the state where the cylindrical portion 52 of the guide member 48 engages with the connection hole 39 of the clamp portion 36. As a result, the workability of the assembly can be improved.

Figure 7:
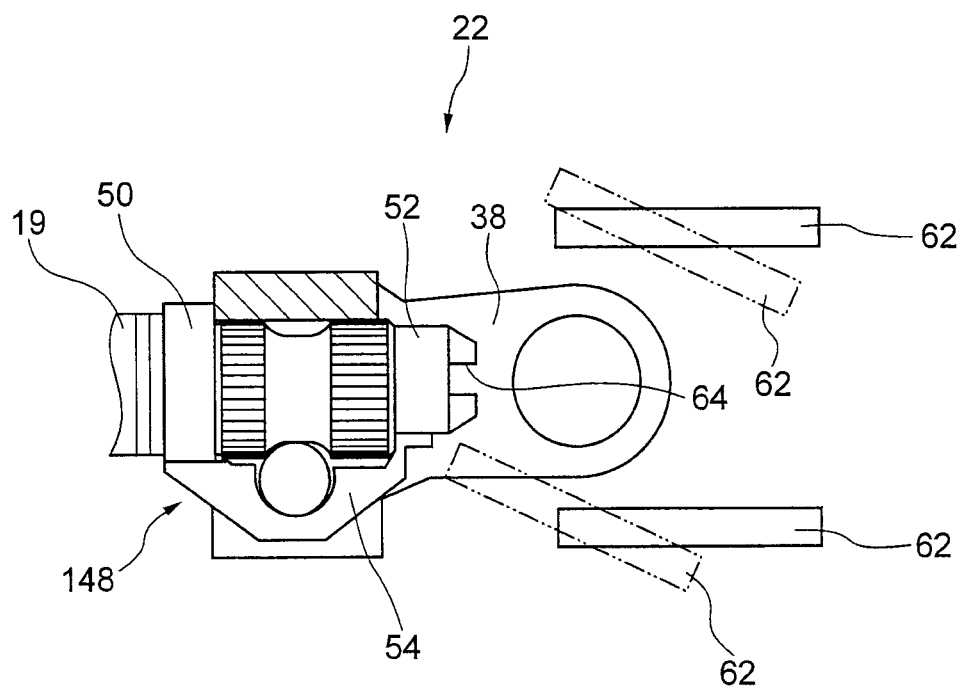
FIG. 7 is a side view illustrating a state where the yoke is joined to the pinion shaft to which the guide member according to a modified example of the first embodiment is secured, the yoke being depicted in section.

Note that a slit may be formed in the upper end portion of the cylindrical portion 52 to further facilitate the collapse of the cylindrical portion 52 of the guide member 48 in the first embodiment. FIG. 7 is a side view illustrating a state where the yoke 22 is joined to the pinion shaft 19 to which a guide member 148 according to a modified example is secured. Incidentally, FIG. 7 depicts the yoke 22 in section.

As illustrated in FIG. 7, the guide member 148 according to the modified example includes a slit 64 formed in the upper end portion of the cylindrical portion 52. Other configurations are the same as those in the first embodiment. The slit 64 is formed in a direction orthogonal to the axial direction of the cylindrical portion 52 and along a direction in which the couple of arm portions 38, 38 of the yoke 22 are disposed in the face-to-face relation. The slit 64 is formed along this direction, whereby the joint angle of the upper sided yoke 20 with respect to the lower sided yoke 22 augments as indicated by a broken line in FIG. 7 upon the vehicle collision and other equivalent events, and the cylindrical portion 52 is easier to collapse when the arm portions 62, 62 are brought into contact with the cylindrical portion 52. Note that a plurality of slits 64 may also be provided.

Second Embodiment

Next, a second embodiment of the present application will be described with reference to FIGS. 8 through 10. In the second embodiment, the same or corresponding members as or to those in the first embodiment discussed above are designated by the reference numerals used in the first embodiment, each numeral having an addition of "200". For example, the pinion shaft 19 in the first embodiment is indicated by a numeral "219" in the second embodiment.

Furthermore, in the second through fifth embodiments, the components having the same structures as those in the first embodiment are marked with only the reference numerals, and detailed explanations thereof are omitted, while the detailed discussion will focus on the components having different structures from those in the first embodiment.

A steering apparatus according to the second embodiment has the same basic configuration as that of the steering apparatus 100 illustrated in FIG. 1 in the first embodiment.

The pinion shaft 219 of the steering apparatus according to the second embodiment also has the same shape and structure as those in the first embodiment.

Figure 8A:
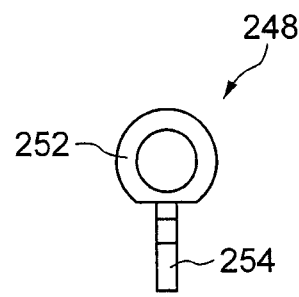
FIGS. 8A, 8B and 8C are simplex views of the guide member according to a second embodiment.
Figure 8B:
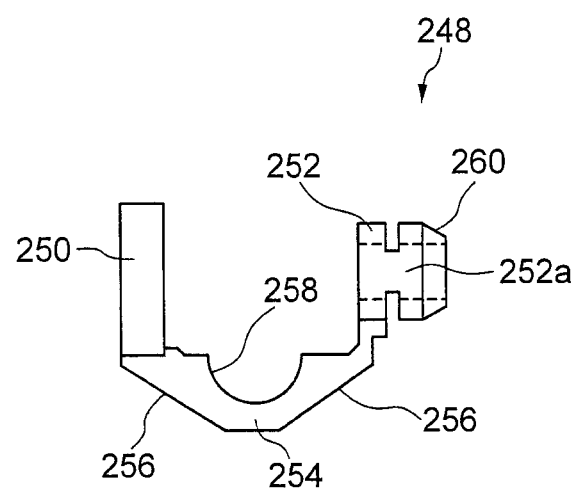
Figure 8C:
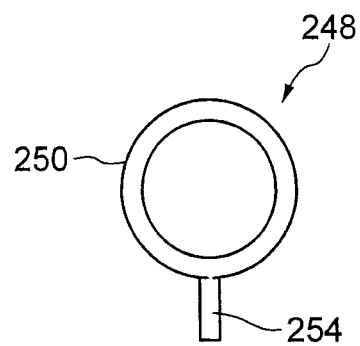
Figure 9:
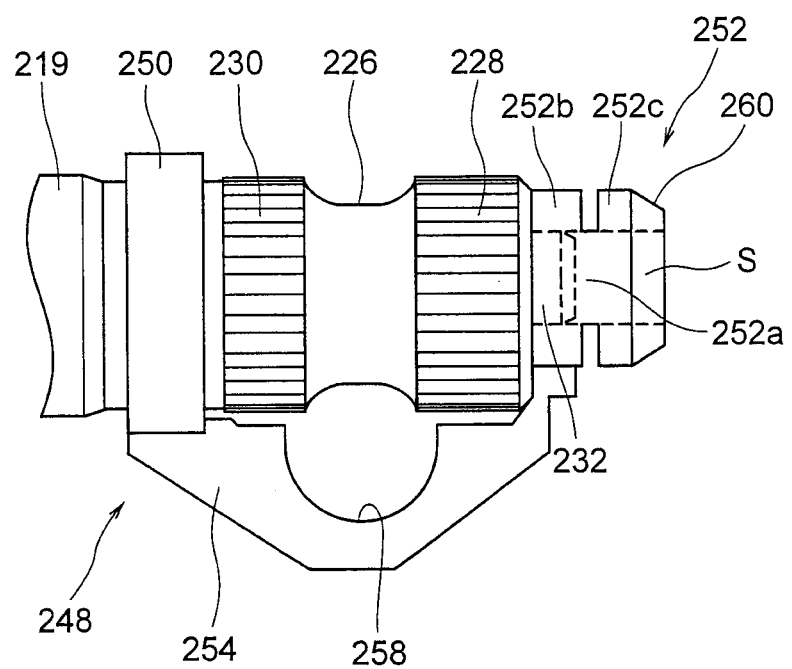
FIG. 9 is an enlarged side view illustrating an upper end portion of the pinion shaft to which the guide member according to the second embodiment is secured.

FIGS. 8A, 8B and 8C are simplex views of a guide member 248 according to the second embodiment; FIG. 8A is a front view of a cylindrical portion 252; FIG. 8B is a side view of the whole components; and FIG. 8C is a front view of a ring portion 250. FIG. 9 is a side view illustrating an upper end portion of the pinion shaft 219 to which the guide member 248 is secured.

The guide member 248 has the same shape and structure as those in the first embodiment except the cylindrical portion 252.

In the second embodiment, the cylindrical portion 252 includes a portion to be ruptured 252a formed at a portion, adjacent to the rear side of the vehicle, of a protruded portion 232 of the pinion shaft 219, the portion to be ruptured 252a being bent or sheared upon a contact of an upper sided yoke, i.e., an opposite yoke paired with a yoke 222 fitted to the pinion shaft 219 when the joint angle augments due to the collision of the vehicle.

The portion to be ruptured 252a is formed such a shape as to leave two portions in the face-to-face relation with arm portions 238, 238 of the yoke 222 fitted to the pinion shaft 219 but to notch other portions on the same circumference of the cylindrical portion 252. In other words, the cylindrical portion 252 is separated into a vehicle front sided portion 252b, i.e., a rotary shaft sided cylindrical portion, and a vehicle rear sided portion 252c, i.e., an opposite yoke sided cylindrical portion; and the portion to be ruptured 252a is positioned between the vehicle front sided portion 252b and the vehicle rear sided portion 252c, and extends to a fixed length in the circumferential direction with positions being centered, which are distanced at approximately 90° on both sides on the circumference of the cylindrical portion 252 on the basis of a direction in which a slit engagement plate 254 protrudes from a central axial line of the cylindrical portion 252 when viewed in the direction of this central axial line, the portion to be ruptured 252a being configured as a connecting portion that connects the vehicle front sided portion 252b and the vehicle rear sided portion 252c together in the axial direction.

Figure 10:
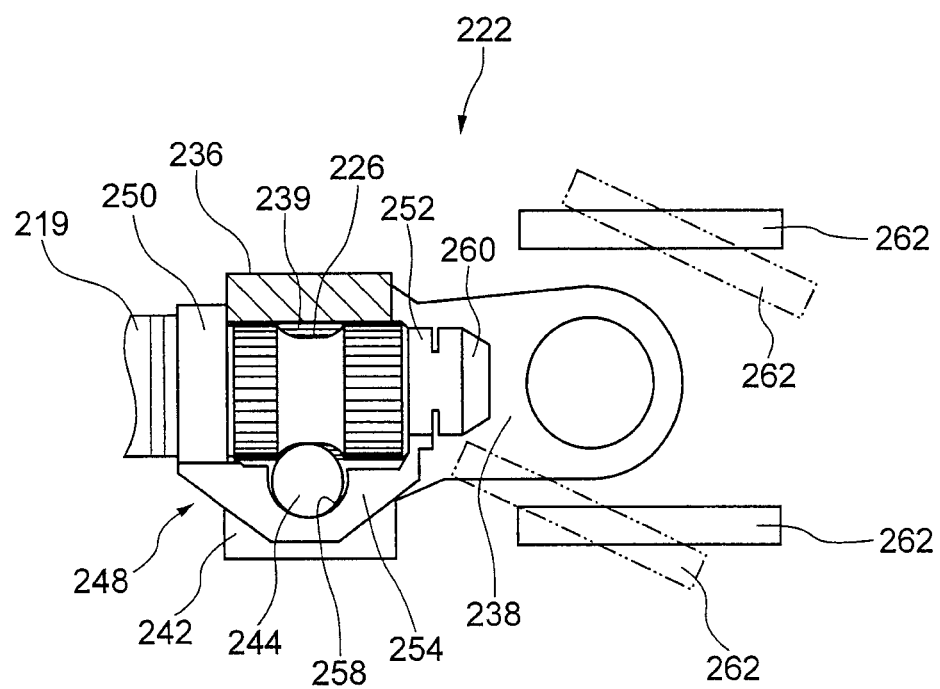
FIG. 10 is a side view illustrating a state of joining the yoke to the pinion shaft to which the guide member according to the second embodiment is secured, the yoke being depicted in section.

FIG. 10 is a side view illustrating a state of joining the yoke 222 to the pinion shaft 219 to which the guide member 248 is secured. Note that FIG. 10 depicts the yoke 222 in section.

The second embodiment has a configuration that the cylindrical portion 252 is provided with the portion to be ruptured 252a, and the vehicle rear side portion of the cylindrical portion 252 is raptured upon the contact with the arm portions 262, 262, thereby not hindering the arm portions 262, 262 from moving further than in the first embodiment. Such being the configuration, the function of the joint angle, which is required in the same way as hitherto, is not deteriorated.

The assembly of the guide member 248 according to the second embodiment to the pinion shaft 219 and the assembly of the yoke 222 to the pinion shaft 219, can be conducted by the same method as in the first embodiment.

Note that the shape of the portion to be ruptured 252a described above is preferable as a shape of a portion to be ruptured formed in the cylindrical portion, and, however, the portion to be ruptured may take whatever shapes on condition that the portion to be ruptured is bent or sheared upon the contact with the opposite yoke paired with the yoke fitted to the pinion shaft to allow a movement of the opposite yoke, and may also be composed of a material different from that of the cylindrical portion. Another available configuration is that the rapture is accelerated by notching the cylindrical portion without providing the portion to be ruptured.

Still another available configuration is that neither the cavity S nor the chamfer 260 is formed.

Yet another available configuration is that a portion, closer to the vehicle rear side than the portion to be ruptured, of the cylindrical portion may be removed by intentionally rapturing the portion to be ruptured after fitting the yoke to the pinion shaft.

Third Embodiment

Next, a third embodiment of the present application will be described with reference to FIGS. 11 through 13. In the third embodiment, the same or corresponding members as or to those in the first embodiment discussed above are designated by the reference numerals used in the first embodiment, each numeral having an addition of "300". For example, the pinion shaft 19 in the first embodiment is indicated by a numeral "319" in the third embodiment.

A steering apparatus according to the third embodiment has the same basic configuration as that of the steering apparatus 100 illustrated in FIG. 1 in the first embodiment.

The pinion shaft 319 of the steering apparatus according to the third embodiment also has the same shape and structure as those in the first embodiment.

Figure 11A:
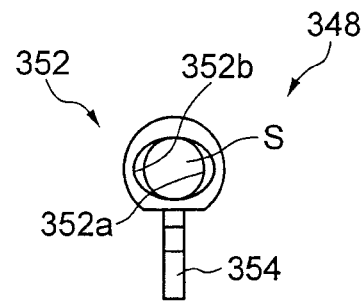
FIGS. 11A, 11B and 11C are simplex views of the guide member according to a third embodiment.
Figure 11B:
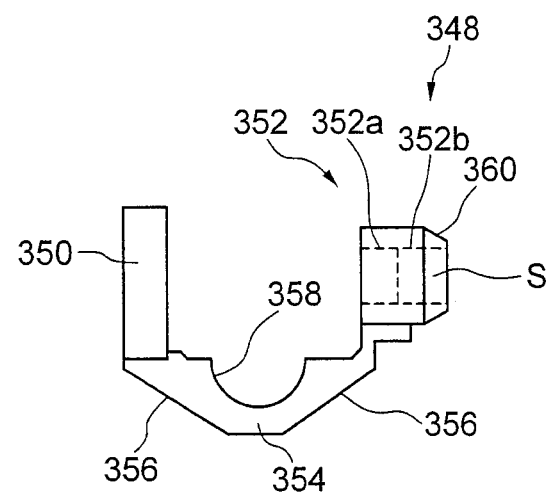
Figure 11C:
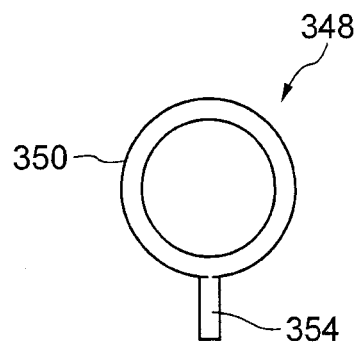
Figure 12A:
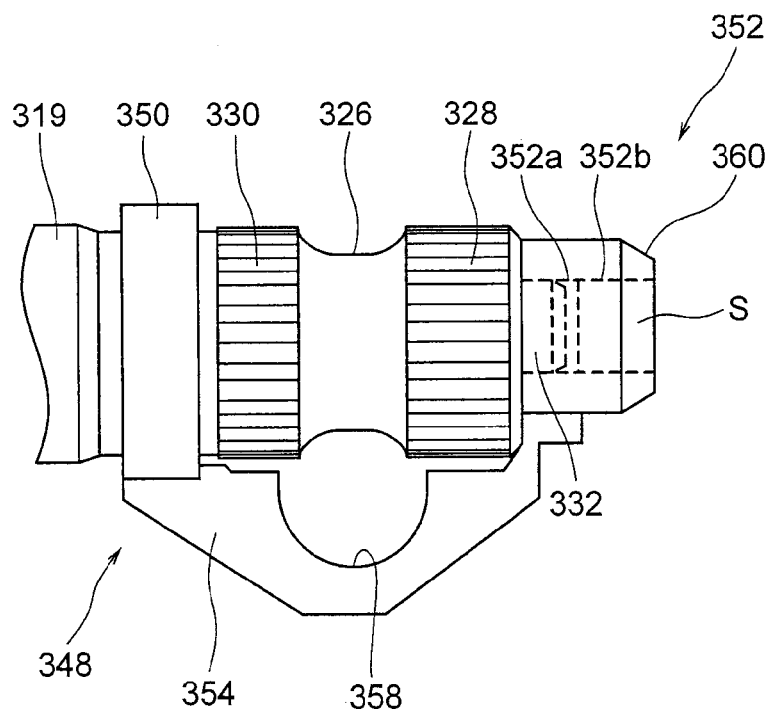
FIGS. 12A and 12B are enlarged views each illustrating an upper end portion of the pinion shaft to which the guide member according to the third embodiment is secured.
Figure 12B:
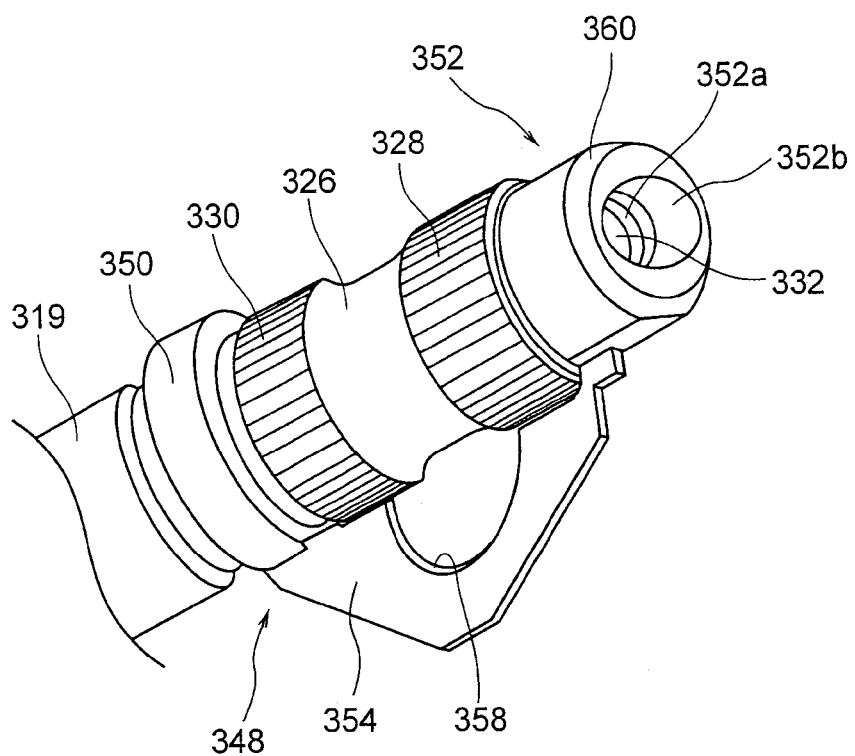

FIGS. 11A, 11B and 11C are simplex views of a guide member 348 according to the third embodiment; FIG. 11A is a front view of a cylindrical portion 352; FIG. 11B is a side view of the whole components; and FIG. 11C is a front view of a ring portion 350. FIGS. 12A and 12B are enlarged views each illustrating an upper end portion of the pinion shaft 319 to which the guide member 348 is secured; FIG. 12A is a side view; and FIG. 12B is a perspective view.

The guide member 348 has the same shape and structure as those in the first embodiment except the cylindrical portion 352.

In the third embodiment, a large portion of the cavity S formed by the cylindrical portion 352 is configured by an opposite yoke sided inner peripheral surface 352b. The opposite yoke sided inner peripheral surface 352b takes, as depicted in FIG. 11A, an elliptical shape in section vertical to the axial direction, the elliptical shape being long in a direction vertical to a protruding direction of a slit engagement plate 354. To be specific, the opposite yoke sided inner peripheral surface 352b takes the elliptical shape in section vertical to the axial direction, a long side of which is disposed in the direction of connecting the couple of arm portions 338, 338 of a yoke 322 secured to the pinion shaft 319, i.e., in such a direction the arm portions 338, 338 are in the face-to-face relation. This configuration facilitates deformation of the portion, configuring the opposite yoke sided inner peripheral surface 352b, of the cylindrical portion 352 in a direction of a short side of the ellipse of the opposite yoke sided inner peripheral surface 352b.

The short side of the ellipse of the opposite yoke sided inner peripheral surface 352b has substantially the same length of a diameter of a circle of a shaft member sided inner peripheral surface 352a, while the long side of the ellipse of the opposite yoke sided inner peripheral surface 352b is larger than the diameter of the circle of the shaft member sided inner peripheral surface 352a.

Figure 13:
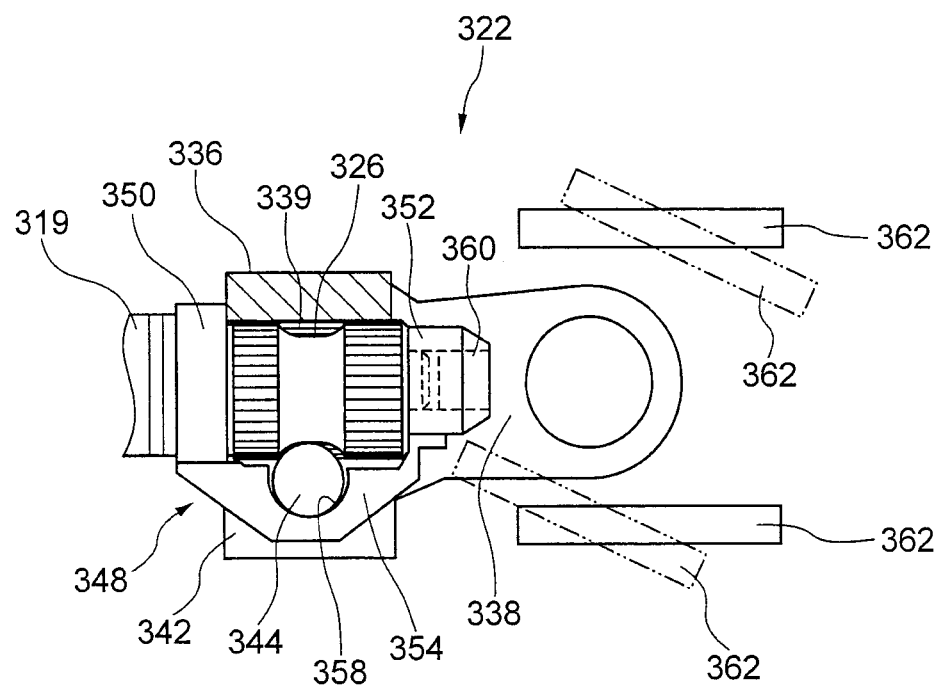
FIG. 13 is a side view illustrating a state of joining the yoke to the pinion shaft to which the guide member according to the third embodiment is secured, the yoke being depicted in section.

FIG. 13 is a side view illustrating a state of how the yoke 322 is joined to the pinion shaft 319 to which the guide member 348 according to the third embodiment is secured. Note that FIG. 13 depicts the yoke 322 in section.

The assembly of the guide member 348 according to the third embodiment to the pinion shaft 319 and the assembly of the yoke 322 to the pinion shaft 319, can be conducted by the same method as in the first embodiment.

Note that the shaft member sided inner peripheral surface 352a and the opposite yoke sided inner peripheral surface 352b of the cylindrical portion 352 may not penetrate continuously in the axial direction, and a partition may be provided between the shaft member sided inner peripheral surface 352a and the opposite yoke sided inner peripheral surface 352b in the third embodiment.

The central line may not necessarily be shared between the circle of the shaft member sided inner peripheral surface 352a of the cylindrical portion 352 and the ellipse of the opposite yoke sided inner peripheral surface 352b.

The cylindrical portion 352 can be also configured not to chamfer the yoke sided outer peripheral surface.

Fourth Embodiment

Figure 14A:
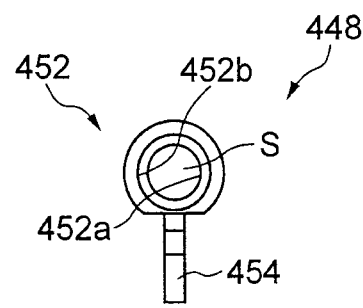
Figure 14B:
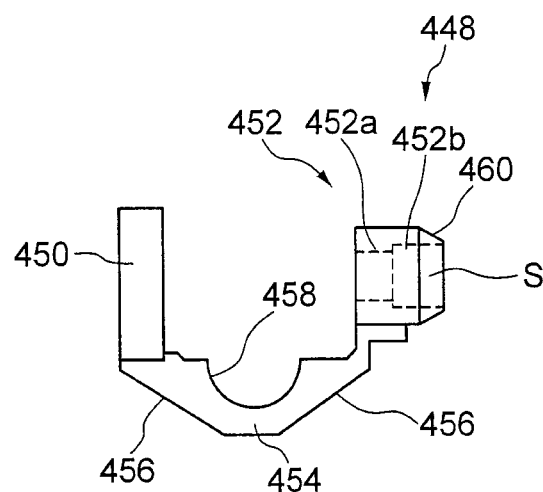
Figure 14C:
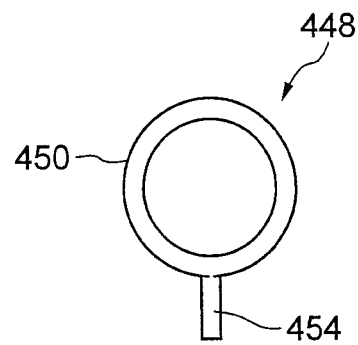
FIG. 14C is a front view of the ring portion.
Figure 15A:
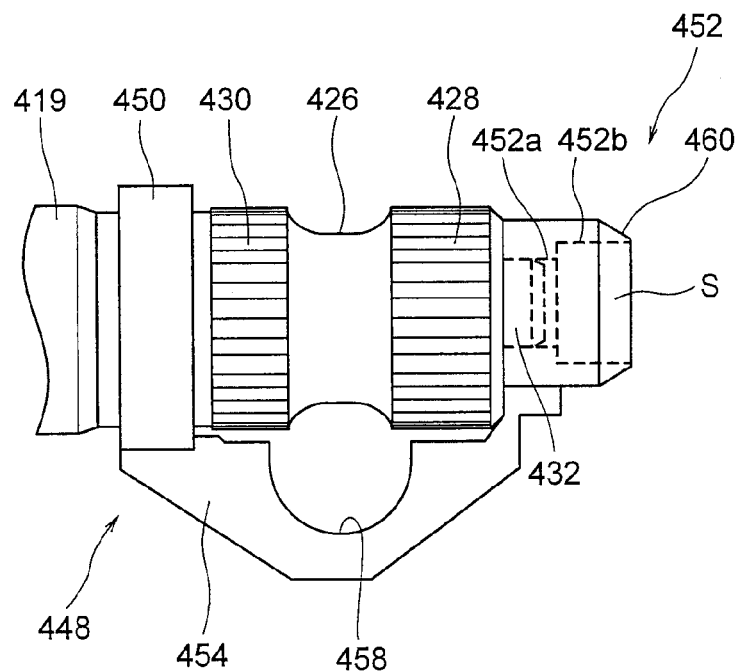
FIGS. 15A and 15B are enlarged views each illustrating the upper end portion of the pinion shaft to which the guide member according to a fourth embodiment is secured.
Figure 15B:
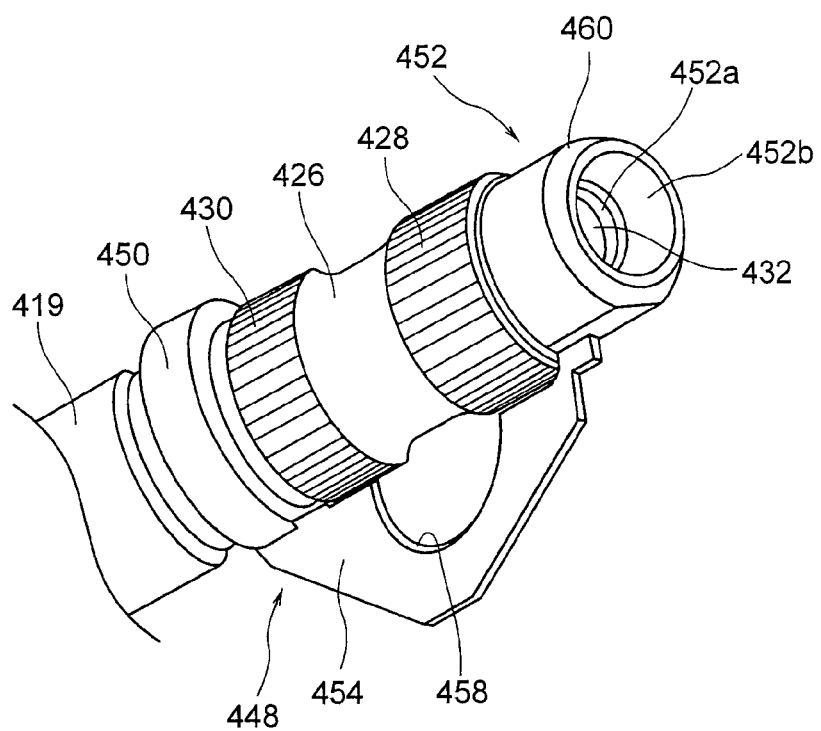

Next, a fourth embodiment of the present application will be described with reference to FIGS. 14 through 16. In the fourth embodiment, the same or corresponding members as or to those in the first embodiment discussed above are designated by the reference numerals used in the first embodiment, each numeral having an addition of "400". For example, the pinion shaft 19 in the first embodiment is indicated by a numeral "419" in the fourth embodiment.

A steering apparatus according to the fourth embodiment has the same basic configuration as that of the steering apparatus 100 illustrated in FIG. 1 in the first embodiment.

The pinion shaft also has the same shape and structure as those in the first embodiment.

The guide member 448 has the same shape and structure as those in the first embodiment except the cylindrical portion 452.

In the fourth embodiment, a large portion of the cavity S formed by the cylindrical portion 452 is configured by an opposite yoke sided inner peripheral surface 452b. The opposite yoke sided inner peripheral surface 452b has, as illustrated in FIG. 14A, a larger inside diameter than that of a shaft member sided inner peripheral surface 452a, and a portion, configuring the opposite yoke sided inner peripheral surface 452b, of the cylindrical portion 452 formed thinner in wall thickness than a portion configuring the shaft member sided inner peripheral surface 452a. This configuration enables a firm connection with a protruded portion 432 at the position configuring the shaft member sided inner peripheral surface 452a, and facilitates the deformation of the portion, configuring the opposite yoke sided inner peripheral surface 452b, of the cylindrical portion 452.

Figure 16:
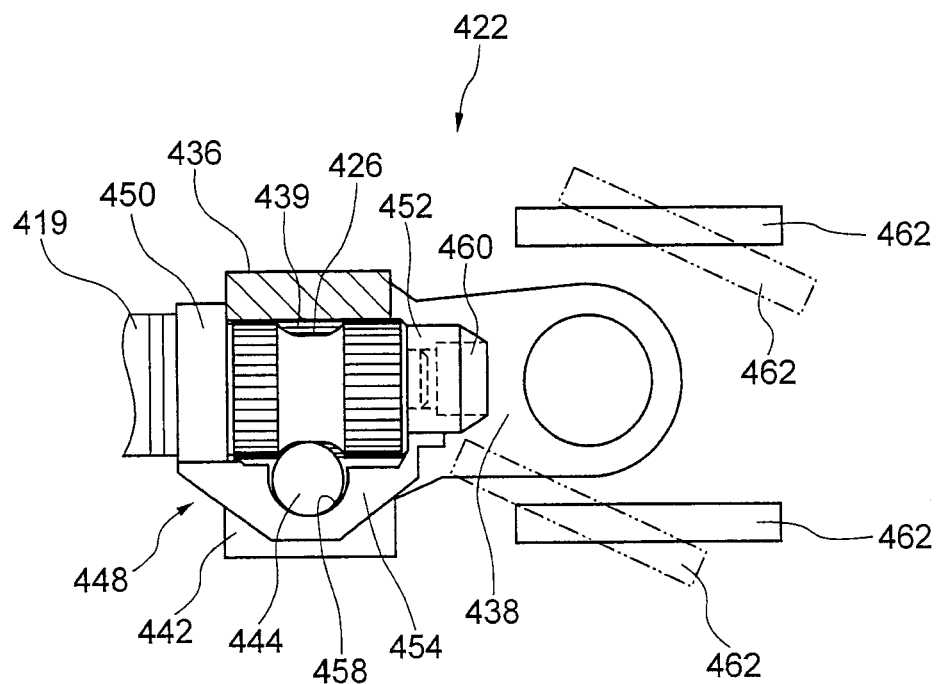
FIG. 16 is a side view illustrating a state of joining the yoke to the pinion shaft to which the guide member according to the fourth embodiment is secured, the yoke being depicted in section.

FIG. 16 is a side view illustrating a state of how the yoke 422 is joined to the pinion shaft 419 to which the guide member 448 according to the fourth embodiment is secured. Note that FIG. 16 depicts the yoke 422 in section.

The large portion of the cavity S formed by the cylindrical portion 452 is formed by the thin portion configuring the opposite yoke sided inner peripheral surface 452b of the cylindrical portion 452, and hence the cylindrical portion 452 is much easier to elastically deform corresponding to the contacts of the arm portions 462, 462 on the side of the yoke 420 than in the first embodiment. This configuration being adopted, the function of the joint angle, which is required in the same way as hitherto, is not deteriorated.

The assembly of the guide member 448 according to the fourth embodiment to the pinion shaft 419 and the assembly of the yoke 422 to the pinion shaft 419, can be conducted by the same method as in the first embodiment.

Note that the shaft member sided inner peripheral surface 452a and the opposite yoke sided inner peripheral surface 452b of the cylindrical portion 452 may not penetrate continuously in the axial direction, and, e.g., a partition may be provided between the shaft member sided inner peripheral surface 452a and the opposite yoke sided inner peripheral surface 452b in the fourth embodiment.

The central line may not necessarily be shared between the shaft member sided inner peripheral surface 452a and the opposite yoke sided inner peripheral surface 452b of the cylindrical portion 452, and a boundary between the shaft member sided inner peripheral surface 452a and the opposite yoke sided inner peripheral surface 452b can be also configured to gradually vary the inside diameter.

The cylindrical portion 452 can be configured not to chamfer the outer peripheral surface on the side of the yoke.

Fifth Embodiment

Next, a fifth embodiment of the present application will be described with reference to FIGS. 17 through 21. In the fourth embodiment, the same or corresponding members as or to those in the first embodiment discussed above are designated by the reference numerals used in the first embodiment, each numeral having an addition of "500". For example, the pinion shaft 19 in the first embodiment is indicated by a numeral "519" in the fifth embodiment.

A steering apparatus according to the fifth embodiment has the same basic configuration as that of the steering apparatus 100 illustrated in FIG. 1 in the first embodiment.

Figure 17:
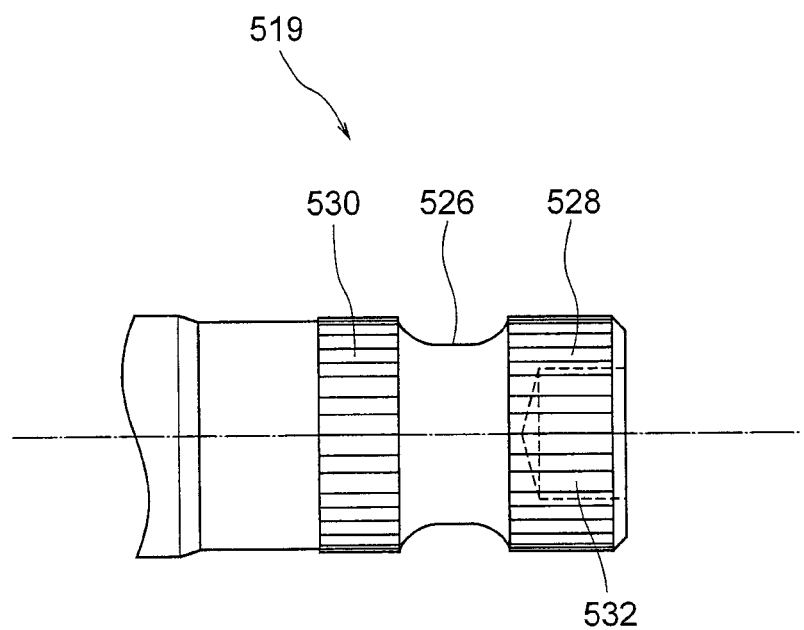
FIG. 17 is an enlarged view illustrating the upper sided portion of the pinion shaft according to a fifth embodiment.

FIG. 17 is an enlarged view illustrating an upper sided portion of a pinion shaft 519.

In the fifth embodiment, the upper end portion of the pinion shaft 519 is formed with a circular hole 532 holed in the direction of the central axis of the pinion shaft 519 from an end surface. The hole 532 is formed coaxially with the pinion shaft 519, and has a depth being slightly shallower than an axis-directional dimension of an upper sided serration 528.

Figure 18A:
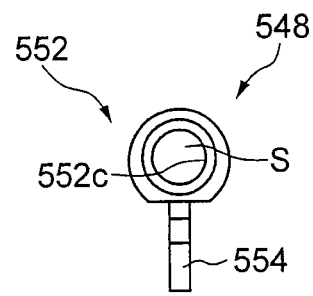
FIGS. 18A, 18B and 18C are simplex views of the guide member according to the fifth embodiment.
Figure 18B:
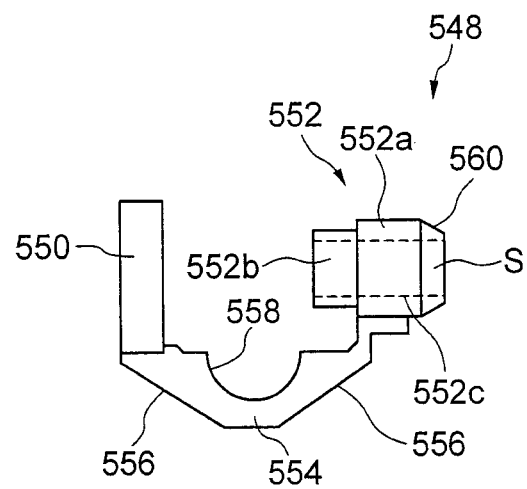
Figure 18C:
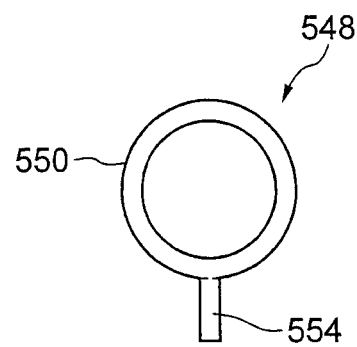
Figure 19A:
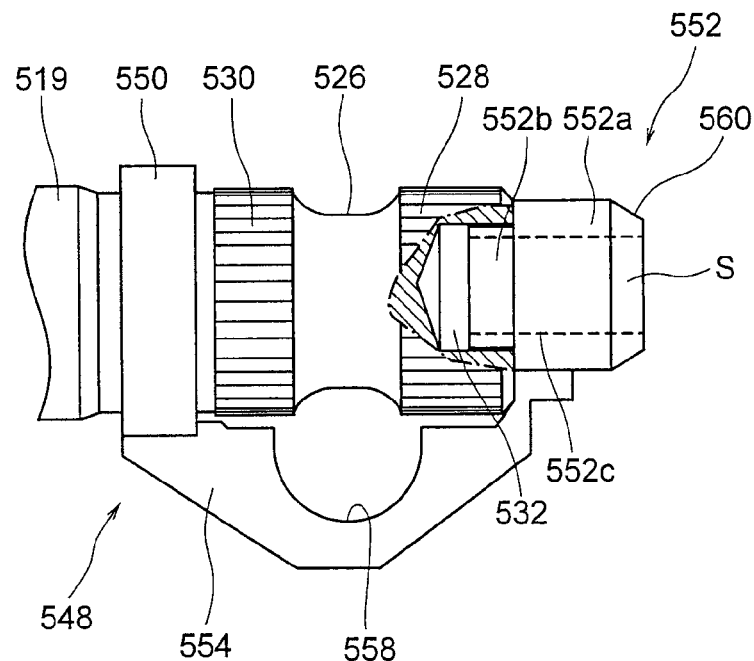
FIGS. 19A and 19B are enlarged views each illustrating the upper end portion of the pinion shaft to which the guide member according to the fifth embodiment is secured.
Figure 19B:
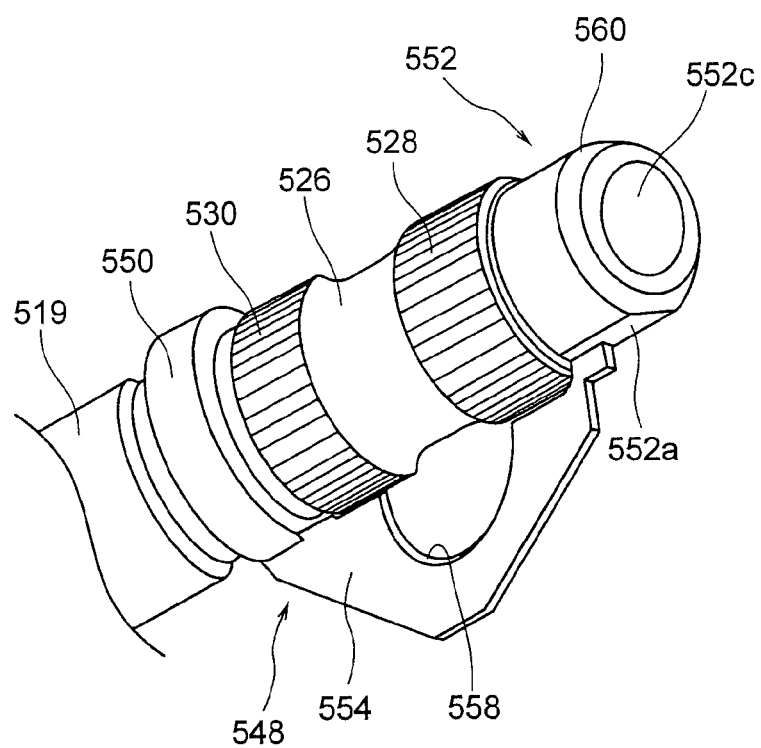

FIGS. 18A, 18B and 18C are simplex views of a guide member 548; FIG. 18A is a front view of a cylindrical portion 552; FIG. 18B is a side view of the whole components; and FIG. 18C is a front view of a ring portion 550. FIGS. 19A and 19B are enlarged views each illustrating an upper end portion of the pinion shaft 519 to which the guide member 548 is secured; FIG. 19A is a side view with some portions being cut off; and FIG. 19B is a perspective view.

The guide member 548 has the same shape and structure as those in the first embodiment except the cylindrical portion 552.

In the fifth embodiment, the cylindrical portion 552 includes a large diametrical portion 552a disposed in contact with a front end of the pinion shaft 519, and a small diametrical portion 552b inserted into the hole 532 formed in the upper end portion of the pinion shaft 519.

Figure 20:
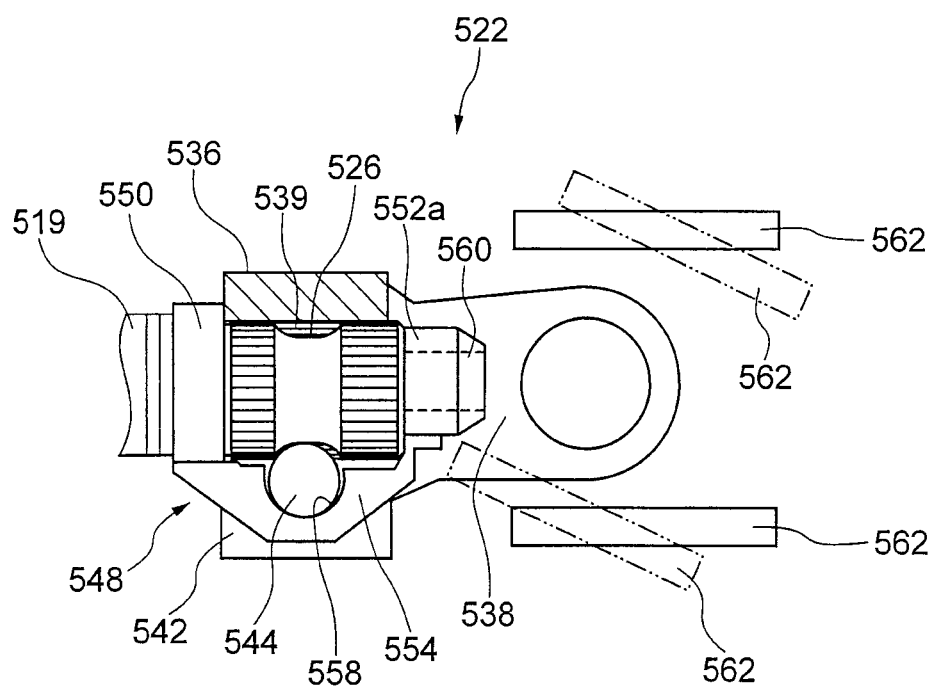
FIG. 20 is a side view illustrating a state of joining the yoke to the pinion shaft to which the guide member according to the fifth embodiment is secured, the yoke being depicted in section.

FIG. 20 is a side view illustrating a state of how the yoke 522 is joined to the pinion shaft 519 to which the guide member 548 is secured. Note that FIG. 20 depicts the yoke 522 in section.

Described next is a method of assembling the guide member 548 to the pinion shaft 519.

The assembly of the guide member 548 to the pinion shaft 519 involves, at first, setting the steering gear mechanisms in the straight forward state. Then, an angle of the pinion shaft 519 is also set in the straight forward state. Thereafter, a ring portion 550 is press-fitted onto the outer peripheral surface of the pinion shaft 519 while making alignment in a rotational direction so that the slit engagement plate 554 of the guide member 548 extends in the axial direction in a specified circumferential position, i.e., a specified rotational position, and the small diametrical portion 552b of the cylindrical portion 552 is also press-fitted into the hole 532 of the upper end of the pinion shaft 519. An end portion of the small diametrical portion 552b may be chamfered to assist the insertion. Herein, "the specified rotational position of the slit engagement plate 554" is the same as the circumferential position, i.e., the rotational position of the slit 542 of the yoke 522 when setting the steering wheel in the neutral position. Thus, the guide member 548 is assembled in the specified position of the pinion shaft 519.

The method of assembling the yoke 522 to the pinion shaft 519 is the same as in the first embodiment.

Figure 21:
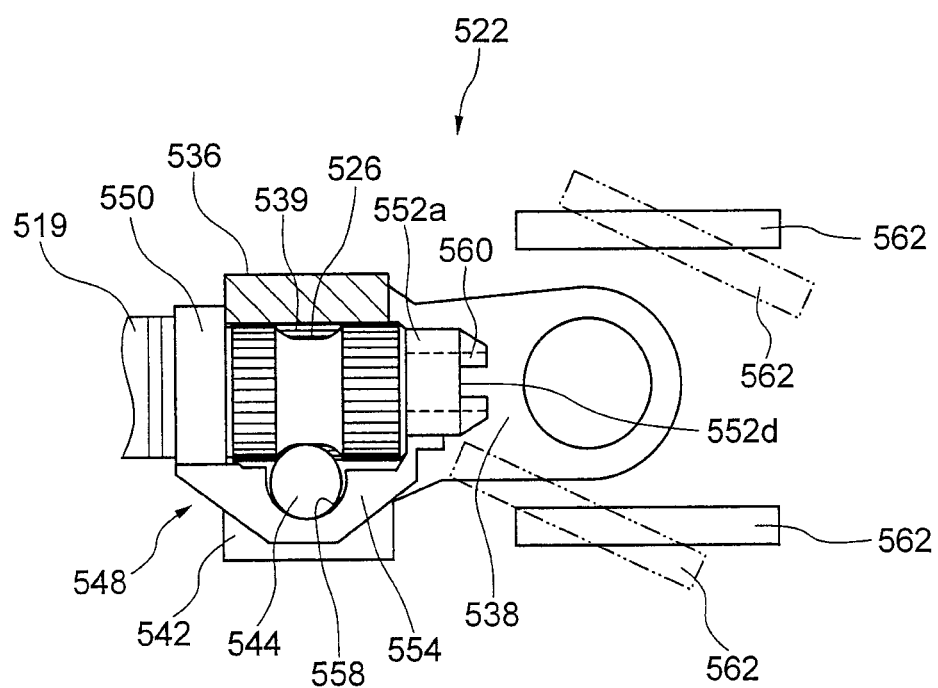
FIG. 21 is a side view of a state of joining the yoke to the pinion shaft to which the guide member according to a modified example of the fifth embodiment is secured, the yoke being depicted in section.

FIG. 21 is a side view of a state of how the yoke is joined to the pinion shaft to which the guide member according to a partially modified example of the embodiment discussed above is secured, illustrating the yoke in section.

In the present modified example, a slit 552d extending in the direction orthogonal to the axial direction is formed in an opposite yoke sided portion of the large diametrical portion 552a, and the front end of the large diametrical portion 552a is configured to include two circular arc portions have the face-to-face relation with each other in the radial direction. The slit 552d is formed substantially in parallel with a direction of a rotational axis line of a rotation of an arm portion 562 of the opposite yoke as indicated by a broken line in FIG. 27. Other configurations are the same as those in the embodiment discussed above.

According to the modified example, the cylindrical portion 552 is configured to further facilitate the deformation upon the contact with the arm portion of the opposite yoke but not to hinder a variation of a relative angle between the couple of yokes.

Note that the small diametrical portion 552b may not be formed in the cylindrical shape but may have, e.g., a bottom portion formed on the surface on the side of the pinion shaft 519, and may not include the cavity inside in the fifth embodiment.

The cylindrical portion 552 can be also configured not to chamfer the yoke sided outer peripheral surface in the fifth embodiment.

The invention of the present application has been discussed so far by way of the first through fifth embodiments, and can be properly modified without being limited to these embodiments described above.

Figure 22:
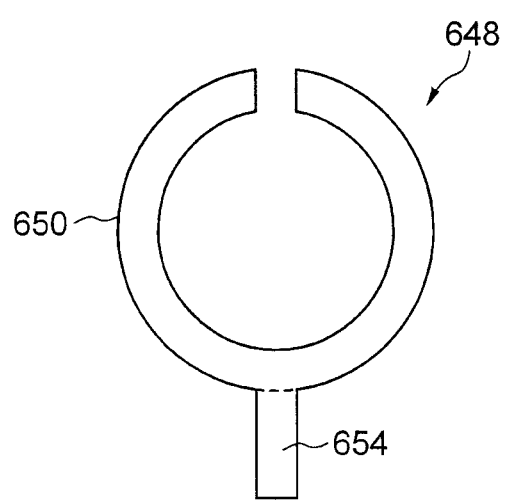
FIG. 22 is a front view of the ring portion, depicting a modified example of the guide member according to the first through fifth embodiments.

For example, in the embodiments described above, the ring portion taking the shape being continuous in the circumferential direction is fitted on the pinion shaft, but is not limited to the shape being continuous in the circumferential direction. Specifically, as depicted in FIG. 22, a ring portion 650 may be notched in the axial direction. The notch enables the ring portion 650 to be fitted on the pinion shaft stably even with dimensional accuracy of the pinion shaft being unsatisfactory to some extent. With this contrivance, it is feasible to reduce a manufacturing cost such as facilitating working of the pinion shaft, improving the workability of the assembling operation and decreasing a raw material and other equivalent elements.

DESCRIPTION OF REFERENCE NUMERALS AND SYMBOLS 1 steering wheel
2 steering shaft
3 steering column
4 steering assist mechanism
5 steering gear mechanism
6A gear housing 7 outer shaft
8 inner shaft
9 outer column
10 inner column
11 deceleration mechanism
11a housing
12 electric motor
14 output shaft
15U upper vehicle sided bracket
15L lower vehicle sided bracket
16 vehicle sided member
17A, 17B universal joint
18 intermediate shaft
19, 219, 319, 419, 519 pinion shaft
20 upper sided yoke
22, 222, 322, 422, 522 lower sided yoke
24 joint cross
26, 226, 326, 426, 526 annular groove
28, 228, 328, 428, 528 upper sided serration
30, 230, 330, 430, 530 lower sided serration
32, 232, 332, 432 protruded portion
532 hole portion
34, 234, 334, 434 chamfer
36, 236, 336, 436, 536 clamp portion
38, 238, 338, 438, 538 arm portion
38a, 238a, 338a, 438a, 538a through-hole
39, 239, 339, 439, 539 connection hole
40 serration
41 slit forming portion
42, 242, 342, 442, 542 slit
44, 244, 344, 444, 544 clamping bolt
46 through-hole
48, 148, 248, 348, 448, 548, 648 guide member
50, 250, 350, 450, 550, 650 ring portion
52, 252, 352, 452, 552 cylindrical portion
252a portion to be ruptured
352a, 452a shaft member sided inner peripheral surface
552a large diametrical portion
252b vehicle front sided portion
352b, 452b opposite yoke sided inner peripheral surface
552b small diametrical portion
252c vehicle rear sided portion
352c opposite yoke sided inner peripheral surface
552c through-hole
552d slit
54, 254, 354, 454, 554, 654 slit engagement plate
56, 256, 356, 456, 556 inclined portion
58, 258, 358, 458, 558 bolt positioning portion
60, 260, 360, 460, 560 chamfer
62, 262, 362, 462, 562 arm portion
100 steering apparatus

What is claimed is:

1. A steering apparatus comprising:
a first shaft member transferring a steering force;
a second shaft member transferring the steering force by connecting to the first shaft member;
a first yoke having a clamp portion fitted to the vicinity of an end portion of the second shaft member on the side of the first shaft member and formed with a first slit penetrating in an axial direction and a radial direction of the second shaft member;
the first yoke also having a couple of arm portions protruding on the side of the first shaft member from an end portion of the clamp portion and disposed facing each other;
an opposite yoke fixed to the first shaft member, the opposite yoke configuring a universal joint by connection with the couple of arm portions of the first yoke; and
a guide member including a cylindrical portion fitted to an end portion of the second shaft member and disposed between the couple of arm portions, and a slit engagement plate protruding outward in the radial direction from a portion, on the side of the second shaft member, of the cylindrical portion, extending to the second shaft member, and disposed within the first slit, wherein the cylindrical portion extends to a side of the first shaft member and is formed with a cavity on an inner side on the side of the first shaft member in a state in which the cylindrical portion is fitted to the end portion of the second shaft member, wherein
the cavity is surrounded by a peripheral wall portion of the cylindrical portion so that the first yoke is brought into contact with, at first, the cylindrical portion of the guide member is assembled to the second shaft member, thereby enabling prevention of the slit engagement plate from being bent and damaged due to contact with the first yoke,
the cylindrical portion extends from the portion from which the slit engagement plate protrudes, to a position in which the cylindrical portion interferes with the opposite yoke when a joint angle of the first yoke against the opposite yoke becomes large upon collision and the like, and
the peripheral wall portion collapses by interference with the opposite yoke.

2. The steering apparatus according to claim 1, wherein a protruded portion extending up to an intermediate portion of the cylindrical portion and fitted in the cylindrical portion is formed on the end portion of the second shaft member.

3. The steering apparatus according to claim 1, wherein a dimension of an inside diameter of an inner peripheral surface of a portion, on the side of the first shaft member, of the cylindrical portion is larger than on the side of the second shaft member.

4. The steering apparatus according to claim 1, wherein a front end portion of the cylindrical portion is chamfered.

5. The steering apparatus according to claim 1, wherein a second slit being orthogonal to the axial direction of the cylindrical portion and extending in such a direction that the couple of arm portions are in a face-to-face relation, is formed in a front end portion of the cylindrical portion.

6. The steering apparatus according to claim 1, wherein a front end portion, on an inside diametrical side, of the cylindrical portion has an elliptical shape with a long side being set in the direction of the couple of arm portions in the face-to-face relation.

7. The steering apparatus according to claim 1, wherein the cylindrical portion is configured to include: a shaft member sided cylindrical portion fitted to the second shaft member; an opposite yoke sided cylindrical portion disposed on the side of the opposite yoke; and a portion to be ruptured connecting the opposite yoke sided cylindrical portion to the shaft member sided cylindrical portion.

8. The steering apparatus according to claim 1, wherein the end portion of the shaft member is formed with a hole portion, and a small diametrical portion formed in the cylindrical portion is fitted in the hole portion.

* * * * *